(12) United States Patent
Ramzan et al.

(10) Patent No.: US 12,223,380 B2
(45) Date of Patent: Feb. 11, 2025

(54) MULTI-PURPOSE RFID LABEL

(71) Applicant: SML Brand Identification Solutions Limited, Hong Kong (CN)

(72) Inventors: Mohammed Ramzan, Halifax (GB); Mark Abraham, Kettering (GB)

(73) Assignee: SML Brand Identification Solutions Limited (CN)

( * ) Notice: Subject to any disclaimer, the term of this patent is extended or adjusted under 35 U.S.C. 154(b) by 24 days.

(21) Appl. No.: 18/259,453

(22) PCT Filed: Dec. 31, 2020

(86) PCT No.: PCT/IB2020/062600
§ 371 (c)(1),
(2) Date: Jun. 27, 2023

(87) PCT Pub. No.: WO2022/144581
PCT Pub. Date: Jul. 7, 2022

(65) Prior Publication Data
US 2024/0054313 A1    Feb. 15, 2024

(51) Int. Cl.
*G06K 19/077* (2006.01)
*G06K 19/08* (2006.01)

(52) U.S. Cl.
CPC ... *G06K 19/0776* (2013.01); *G06K 19/07767* (2013.01); *G06K 19/08* (2013.01)

(58) Field of Classification Search
CPC ......... G06K 19/07726; G06K 19/0776; G06K 19/07767; G06K 19/0779; G06K 19/07794; G06K 19/07798

USPC .......................................................... 235/492
See application file for complete search history.

(56) References Cited

U.S. PATENT DOCUMENTS

| | | | |
|---|---|---|---|
| 2013/0206846 A1 | 8/2013 | Wilkinson | |
| 2018/0307960 A1* | 10/2018 | Kelsey | G06K 19/07345 |
| 2019/0220724 A1 | 7/2019 | Huhtasalo | |
| 2020/0160142 A1* | 5/2020 | Roth | G06K 7/10366 |

FOREIGN PATENT DOCUMENTS

| WO | 2008/074050 A1 | 6/2008 |
|---|---|---|
| WO | 2013/076352 A1 | 5/2013 |

OTHER PUBLICATIONS

International Searching Authority/EP; International Search Report and Written Opinion of the International Searching Authority, Application No. PCT/IB2020/062600, dated Sep. 28, 2021; 16 pages.

* cited by examiner

*Primary Examiner* — Toan C Ly
(74) *Attorney, Agent, or Firm* — Sunstein LLP (57) ABSTRACT

The disclosure provides RFID labels including a composite label affixed to a surface of a container holding an object, including a first configuration wherein the first label section is positioned in the composite label and wherein the first label section can be removed from the composite label and configured to be affixed to the object.

26 Claims, 7 Drawing Sheets

MULTI-PURPOSE RFID LABEL

CROSS-REFERENCE TO RELATED APPLICATIONS

This application is the national phase entry of International Patent Application No. PCT/IB2020/062600, filed Dec. 31, 2020, the disclosure of which is incorporated herein by reference in its entirety.

FIELD OF THE INVENTION

This disclosure relates to RFID labels for applying to an object and more particularly to such a label containing an RFID device that can be affixed to a surface of a container holding an object and also can also be affixed to an object removed from the container.

BACKGROUND OF THE INVENTION

Products need to be tracked throughout the supply chain from production to point-of-sale. This can be done using labels with a bar code, or other printed information about the labelled product. Radio Frequency Identification (RFID) is a technology that is also used in these label applications. RFID uses radio waves for communication between the label and a reading device. The label usually includes a microchip attached to an antenna. The reader (or interrogator) is capable of reading data from and writing data to the label. The RFID device can be a small microchip encapsulated in plastic, paper or similar material, forming a part of the label, which may be fixed to the product or its packaging.

One advantage of RFID labels is that the labels can be read quickly and with radio frequencies that can penetrate through many non-metallic materials. When products leave production in a shipping box, tracking labeling on the shipping box is required. Using RFID, each shipping box can be tracked using an RFID label, even if the label is not visible.

When products arrive at a point of sale destination, labeling for the products is desired after the products are removed from the shipping box. Tracking the products from each shipping box after the products are removed from the shipping box requires associating the products with the shipping box and can provide potential for logistical tracking error.

One solution requires labeling different products with different label types specific to a shipping box using a variety of different labels in smaller quantities, which results in higher costs and more likelihood for error when products are unpacked from shipping and various labels are applied to the products.

What is needed are labels that can easily and logistically track products from production throughout shipping and through sale.

SUMMARY OF INVENTION

It is an object of the invention to provide RFID labels for applying to a shipping container holding objects wherein the RFID labels contain an RFID device that can also be easily affixed to the objects.

The technology can be further summarized in the following list of features:

In one aspect, a multi-purpose RFID label is provided including: a composite label affixed to a surface of a container holding an object and having an outer perimeter; a first label section located within the outer perimeter of the composite label; the first label section including an RFID transponder interconnected to a first antenna member, the first label section being removable from the composite label; a second label section defined by an area outside of the first label section and within the outer perimeter; the second label section including a second antenna member interconnected to the first antenna member; wherein, in a first configuration, the first label section is positioned within the composite label and the first antenna member is interconnected to the second antenna member thereby forming an RFID label having a first performance characteristic; and wherein, in a second configuration, the first label section is removed from the composite label and is configured to be affixed to the object which has been removed from the container; and wherein the first antenna member is disconnected from the second antenna member and the first label section forms an RFID label having a second performance characteristic different from the first performance characteristic.

In some embodiments, the multi-purpose RFID label can be wherein the first and second performance characteristics include one or both of read range and frequency range, wherein the read range of the RFID label in the first configuration is greater than the read range of the RFID label in the second configuration, and wherein the frequency range is tuned for ETSI or FCC.

In some embodiments, the multi-purpose RFID label can be wherein the read range of the RFID label in the second configuration less than the read range of the RFID label in the first configuration; or the multi-purpose RFID label can be wherein the read range of the RFID label in the first configuration is in the range of approximately five to six meters and the read range of the RFID label in the second configuration is approximately three meters or less.

In some embodiments, the multi-purpose RFID label can be wherein the first label section includes an adhesive layer disposed along a bottom surface thereof.

According to some aspects, the multi-purpose RFID label can be wherein the second label section includes a release layer disposed beneath the adhesive layer of the first label section to allow the first label section to be removed from the composite label.

In some embodiments, the multi-purpose RFID label can be wherein the first label section includes two label sub-sections each having a bottom surface with an adhesive and a top surface, the two label-sub-sections being operative to be folded upon each other such that the bottom surfaces of the label sub-sections are adhered to each other in a face to face arrangement, and wherein one of the two label subsections includes a tab extending out therefrom and having a top surface and a bottom surface including an adhesive, the tab operative to be folded over a portion of the object and then the bottom surface of the tab adhered to the top surface of the other of the two label subsections to affix the first label subsection to the object.

In some embodiments, the multi-purpose RFID label can be wherein the first label section includes: a first label subsection and a second label subsection; the first label subsection including the RFID transponder interconnected to a first portion of the first antenna member, the first label subsection being removable from the first label section; a second label subsection defined by an area outside of the first label subsection section and within an outer perimeter of the first label section; the second label subsection including a second portion of the first antenna member which is interconnected to the first portion of the first antenna member; wherein, in a first configuration, the first label subsection is positioned within the first label section and the first portion and second portion of the first antenna member are interconnected thereby forming an RFID label having the second performance characteristic; and wherein the first label section is configured to be affixed to the object which has been removed from the container; and wherein, in a second configuration, the first label subsection is removed from the first label section and is configured to be affixed to the object which has been removed from the container; and wherein the first portion of the first antenna member is disconnected from the second portion of the first antenna member and the first label subsection forms an RFID label having a third performance characteristic different from the first and second performance characteristics.

According to some aspects, the multi-purpose RFID label can be wherein the second performance characteristic is tuned for the object to be formed of a non-metallic material and the third performance characteristic is tuned for the object to be formed of a metallic material.

In some embodiments, the multi-purpose RFID label can be wherein the second label section includes two label sub-sections each including a portion of the second antenna member, a bottom surface with an adhesive, and a top surface; the two label-sub-sections being be adjacent to each other in a first configuration thereby forming an RFID label having a first performance characteristic tuned for ETSI operation and being operative in a second configuration to be folded upon each other such that the bottom surfaces of the label sub-sections are adhered to each other in a face to face arrangement, thereby forming an RFID label having a first performance characteristic tuned for FCC operation.

In one aspect, a method for using a multi-purpose RFID label is provided, including: applying a composite label affixed to a surface of a container holding an object and having an outer perimeter, the composite label having a first performance characteristic and including; a first label section located within the outer perimeter of the composite label; the first label section including an RFID transponder interconnected to a first antenna member, the first label section being removable from the composite label; a second label section defined by an area outside of the first label section and within the outer perimeter; the second label section including a second antenna member interconnected to the first antenna member; removing the object from the container; removing the first label section from the composite RFID label; and applying the first label section to the object, the first label section forming an RFID label having a second performance characteristic different from the first performance characteristic.

In some embodiments, the method can be wherein the first and second performance characteristics include one or both of read range and frequency range, wherein the read range of the composite RFID label is greater than the read range of the first label section, and wherein the frequency range is tuned for ETSI or FCC.

In some embodiments, the method can be wherein the read range of the first label section is less than the read range of the composite RFID label; or the method can be wherein the read range of the composite RFID label is in the range of approximately five to six meters and the read range of the first label section is approximately three meters or less.

In some embodiments, the method can be wherein the first label section includes an adhesive layer disposed along a bottom surface thereof.

In some embodiments, the method can be wherein the second label section includes a release layer disposed beneath the adhesive layer of first label section and the method includes removing the first label section from the release layer.

In some embodiments, the method can be wherein the first label section includes two label sub-sections each having a bottom surface with an adhesive and a top surface, wherein the two label-sub-sections are folded upon each other such that the bottom surfaces of the label sub-sections are adhered to each other in a face to face arrangement, wherein one of the two label subsections includes a tab extending out therefrom and having a top surface and a bottom surface including an adhesive, and wherein the tab is folded over a portion of the object and then the bottom surface of the tab is adhered to the top surface of the other of the two label subsections to affix the first label subsection to the object.

In some embodiments, the method can be wherein the first label section includes: a first label subsection and a second label subsection; the first label subsection including the RFID transponder interconnected to a first portion of the first antenna member, the first label subsection being removable from the first label section; a second label subsection defined by an area outside of the first label subsection section and within an outer perimeter of the first label section; the second label subsection including a second portion of the first antenna member which is interconnected to the first portion of the first antenna member; wherein, in a first configuration, the first label subsection is positioned within the first label section and the first portion and second portion of the first antenna member are interconnected thereby forming an RFID label having the second performance characteristic; and wherein the first label section is affixed to the object which has been removed from the container; and wherein, in a second configuration, the first label subsection is removed from the first label section and is affixed to the object which has been removed from the container; and wherein the first portion of the first antenna member is disconnected from the second portion of the first antenna member and the first label subsection forms an RFID label having a third performance characteristic different from the first and second performance characteristics.

According to some aspects, the method can be wherein the second performance characteristic is tuned for the object to be formed of a non-metallic material and the third performance characteristic is tuned for the object to be formed of a metallic material.

In some embodiments, the method can be wherein the second label section includes two label sub-sections each including a portion of the second antenna member, a bottom surface with an adhesive, and a top surface; positioning the two label-sub-sections adjacent to each other in a first configuration thereby forming an RFID label having a first performance characteristic tuned for ETSI operation and folding the two label-sub-sections upon each other such that the bottom surfaces of the two label sub-sections are adhered to each other in a face to face arrangement, thereby forming an RFID label having a first performance characteristic tuned for FCC operation.

In one aspect, a RFID label disposed on a container is provided, the RFID label including: a first label section including an RFID transponder interconnected to a first antenna member; the first label section being affixed to a first surface of the container; and a second label section including a second antenna member interconnected to the first antenna member; the second label section being affixed to a second surface of the container.

In some embodiments, the RFID label can be wherein the first label section and the second label section together define a composite RFID label having a first performance characteristic.

In some embodiments, the RFID label can be wherein the first label section is removable from the composite RFID label and wherein when the first label section is removed from the composite RFID label the first antenna member is disconnected from the second antenna member and the first label section has a second performance characteristic different from the first performance characteristic.

In some embodiments, the RFID label can be wherein the composite RFID label having the first performance characteristic is configured for logistics to track the container and wherein the first label section is configured to be applied to an object removed from the container to identify the object in a retail environment.

In one aspect, a method for disposing a RFID label on a container is provided, the method including: applying a first label section including an RFID transponder interconnected to a first antenna member to a first surface of the container; and applying a second label section including a second antenna member interconnected to the first antenna member to a second surface of the container.

In some embodiments, the method can be wherein the first label section and the second label section together define a composite RFID label having a first performance characteristic.

In some embodiments, the method can include removing the first label section from the composite RFID label and wherein when the first label section is removed from the composite RFID label the first antenna member is disconnected from the second antenna member and the first label section has a second performance characteristic different from the first performance characteristic.

According to some aspects, the method can include using the composite RFID label having the first performance characteristic for logistics to track the container, removing an object from the container, and applying the first label section to the object to identify the object in a retail environment.

In one aspect, a multi-purpose RFID label configured to be applied to a surface of a container is provided, including: a first label section including an RFID transponder interconnected to a first antenna member; the first label section having a top surface and a bottom surface; a second label section interconnected to the first label section by a foldable seam; the second label section including a second antenna member interconnected to the first antenna member; the second label section having a top surface and a bottom surface; wherein, in a first configuration, the top and bottom surfaces of the second label section are positioned adjacent to the respective top and bottom surfaces of the first label section and the multi-purpose RFID has a first performance characteristic; and wherein, in a second configuration, the second label section is folded at the seam and the bottom surface of the second label section is affixed to the bottom surface of the first label section in a face to face arrangement and the multi-purpose RFID label has a second performance characteristic different from the first performance characteristic.

In some embodiments, the multi-purpose RFID label can be wherein the first performance characteristic includes a first operational frequency range and the second performance characteristic includes a second operational frequency range.

In some embodiments, the multi-purpose RFID label can be wherein the first operational frequency range is ETSI compliant and the second operational frequency range is FCC compliant.

In one aspect, a method for applying a multi-purpose RFID label configured to a surface of a container is provided, including: providing a first label section including an RFID transponder interconnected to a first antenna member; the first label section having a top surface and a bottom surface; providing a second label section interconnected to the first label section by a foldable seam; the second label section including a second antenna member interconnected to the first antenna member; the second label section having a top surface and a bottom surface; positioning, in a first configuration, the top and bottom surfaces of the second label section adjacent to the respective top and bottom surfaces of the first label section and applying the multi-purpose RFID to the surface of the container to provide has a first performance characteristic; and folding, in a second configuration, the second label section at the seam and affixing the bottom surface of the second label section to the bottom surface of the first label section in a face to face arrangement, applying the multi-purpose RFID label to the surface to provide a second performance characteristic different from the first performance characteristic.

In some embodiments, the method can be wherein the first performance characteristic includes a first operational frequency range and the second performance characteristic includes a second operational frequency range.

In some embodiments, the method can be wherein the first operational frequency range is ETSI compliant and the second operational frequency range is FCC compliant.

BRIEF DESCRIPTION OF THE FIGURES

Embodiments of the present disclosure will now be described, by way of example only, with reference to the attached Figures, wherein.

DETAILED DESCRIPTION OF THE INVENTION

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

In accordance with various embodiments, a multi-purpose RFID label is provided as a single label which contains one or more antenna components and structures. During the manufacturing process, the label may be perforated and/or die-cut at various locations in order to facilitate multi-purpose functions. The label can be produced using standard and traditional manufacturing processes. An intended application can be determined by pre-configuring the label just before affixing onto a container. After attachment onto a container, a portion of the label may then be removed from the container and applied to subsequent containers or objects optionally in alternative configurations for other functions and purposes. Performance characteristics of the various RFID labels described herein may include the "read" range of the RFID label, frequency range for different standards requirements such as ETSI (European Telecommunications Standards Institute) or FCC (U.S. Federal Communications Commission), or other typical performance characteristics. In the various configurations, the RFID labels may be tuned to either ETSI or FCC requirements.

Multi-Purpose RFID Label

Figure 1A:
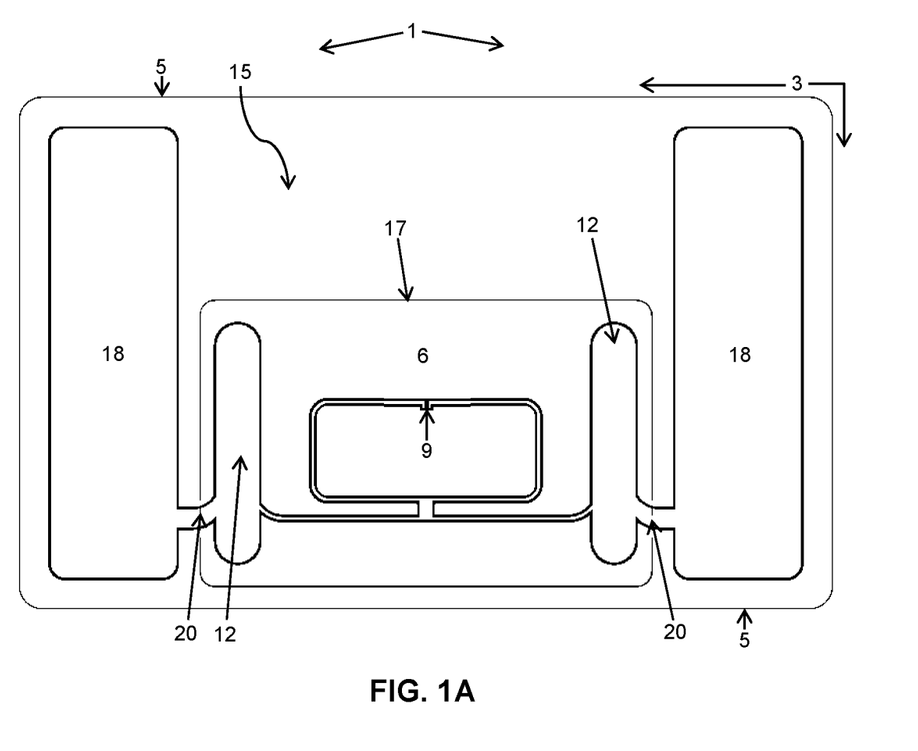
FIG. 1A shows a top view of a multi-purpose RFID label in accordance with various embodiments.

Referring now to FIG. 1A, an embodiment of a multi-purpose RFID label 1 is provided. The multi-purpose RFID label 1 includes a composite RFID label 3 having an outer perimeter 5. The composite label can be affixed to a surface of a container holding an object, such as a cardboard box holding a product. The multi-purpose RFID label 1 includes a first label section 6 located within the outer perimeter 5 of the composite label 3. The first label section 6 includes an RFID transponder 9 interconnected to a first antenna member 12. The multi-purpose RFID label 1 includes a second label section 15 defined by an area outside or coincident with a perimeter 17 of the first label section 6 and within the outer perimeter 5 of the composite label. The second label section 15 includes a second antenna member 18 interconnected to the first antenna member 12.

The first label section 6 is removable from the composite label 3 and when this occurs, the antenna sections 18 are disconnected from antenna sections 12 via releasable connection 20. In a first configuration, the first label section 6 can be positioned in the composite label 3, and the first antenna member 12 is interconnected to the second antenna member 18 forming an RFID label having a first performance characteristic. For example, the first configuration can be used for logistics and applied to a container such as a cardboard box containing an object such as a product. The first performance characteristic may include a particular "read" range, such as a read range sufficient for logistics, which may be in the range of 5-6 meters, for example.

In a second configuration, the first label section 6 can be removed from the composite RFID label 3 and affixed to an object, such as a product contained within the container on which the composite RFID label 3 is affixed. The first antenna member 12 is disconnected from the second antenna member 18 at the releasable connection 20. The first label section 6 can form an RFID label having a second performance characteristic different from the first performance characteristic. With the smaller antenna, the read range may be reduced to, for example, up to 1-2 meters, which is suitable for retail applications. Thus, one label may be used both for logistics tracking (composite RFID label 3) of the container/cardboard box and for retail purposes for the product within the container by affixing the removable first label section 6 to the product shipped within the container.

In connection with FIG. 1A and the other embodiments herein, the label sections herein may include a top surface and a bottom surface. The bottom surface of the label sections can include adhesive. The label sections may include sub-segments each having a bottom surface with an adhesive and a top surface. In certain embodiments, the label sections can be folded upon each other such that the bottom surfaces of the label sections are adhered to each other to form a folded label, wherein the top surface of one of the label sections forms the top surface of a folded label and the other the label section forms the bottom surface of a label folded. The label sections may include any portion of the RFID device disposed on one of the bottom or top surfaces of the folded label or sandwiched between the bottom and top surfaces. The label sections may include optically readable indicia such as one or more bar code labels.

Figure 1B:
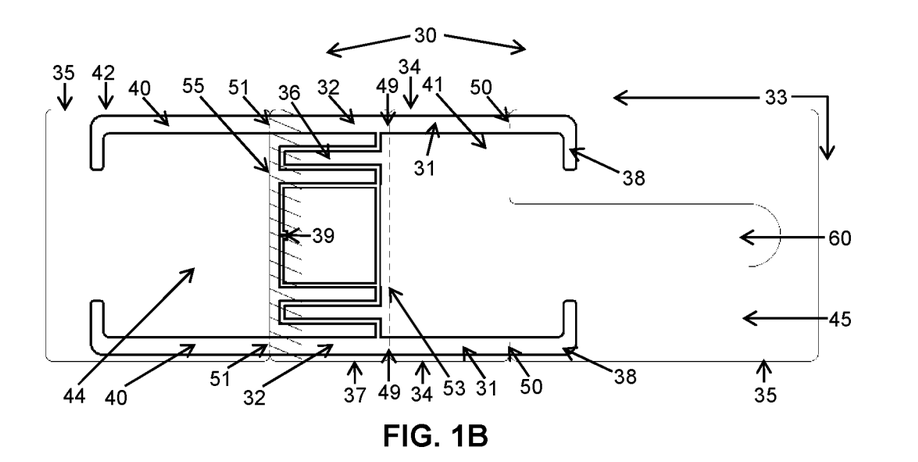
FIG. 1B shows a top view of another embodiment of a multi-purpose RFID label in accordance with various embodiments.

According to another embodiment, FIG. 1B depicts a multi-purpose RFID label 30. The multi-purpose RFID label 30 includes a composite RFID label 33 having an outer perimeter 35. The composite RFID label 33 can be affixed to a surface of a container holding an object, as is the case with composite RFID label 3, FIG. 1A. The multi-purpose RFID label 30 includes a first label section 36, including an RFID transponder 39 interconnected to a first antenna member 32. The first label section 36 includes an outer perimeter 37 located within or coincident with the outer perimeter 35 and a first antenna member 32. The first label section 36 is removable from the composite label 33.

The first antenna member 32 of first label section 36 is interconnected to a second antenna member 31, which is disposed on foldable label section 41 by a foldable connection 49. The first antenna member 32 is also interconnected to a third antenna member 40 disposed on a second label section 44 by a second releasable connection 51.

Second label section 44 is defined by an area outside of a perimeter 37 of the first label section 36, outside of a perimeter 34 of a foldable label section 41, and within the outer perimeter 35. The second label section 44 has a perimeter 42 located within or coincident with the outer perimeter 35. A first seam 53 is disposed between the first label section 36 and the foldable label section 41. A second seam 55 is disposed between the first label section 36 and the second label section 44. The first seam 53 and the second seam 55 are independently foldable, releasable, or both. The foldable section 41 can include an optional peel tab 60 described below.

The composite RFID label 33 also includes a third label section 45 having a fourth antenna member 38, which is interconnected to second antenna member 31 by releasable connection 50. The peel tab 60 of foldable section extends into third label section 45.

Multi-purpose RFID label 30 may be used in several configurations. For example, in a first configuration, the composite RFID label 30 with the first label section 36 can be positioned in the composite label 33, with the first antenna member 32 interconnected to the second antenna member 31 (and to fourth antenna member 38) and to third antenna member 40, forming an RFID label having a first performance characteristic. Like the composite RFID label 3 of FIG. 1A, the first configuration may be used for logistics and applied to a container such as a cardboard box containing an object such as a product. The first performance characteristic may include a particular "read" range, such as read range sufficient for logistics, which may be in the range of 5-6 meters, for example.

In a second configuration, the first label section 36 and the foldable label section 41, with the peel tab 60, can be removed from the composite label 33 and affixed to the object/product, which may be removed from the container/cardboard box on which the composite label 33 is affixed. The removed label sections may be affixed to the object/product for display at a retail location and they include the first antenna member 32 connected to the second antenna member 31. The first antenna member 32 has been disconnected from the third antenna member 40 at the second releasable connection 51 and the second antenna member 31 has been disconnected from fourth antenna member 38 at the releasable connection 50.

To apply this RFID label to the object/product, foldable label section 41 may be folded along first seam 53 and affixed to the bottom of first label section 36. The peel tab 60 may be folded over a portion of an object/product and secured to the object/product by affixing the bottom surface of peel tab 60, which includes an adhesive, to the bottom surface of label section 41, which may also include an adhesive. The first label section 36 can form an RFID label with antenna sections 31 and 32 with a second performance characteristic different from the first performance characteristic. The second read range may be suitable for retail applications and may be in the range of up to 1-2 meters, for example.

Figure 1C:
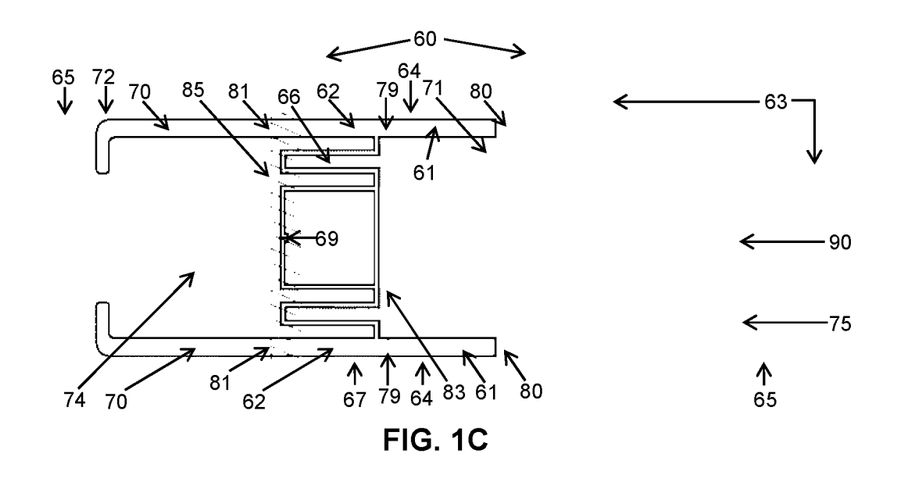
FIG. 1C shows a top view of yet another embodiment of a multi-purpose RFID label in accordance with various embodiments.
Figure 1D:
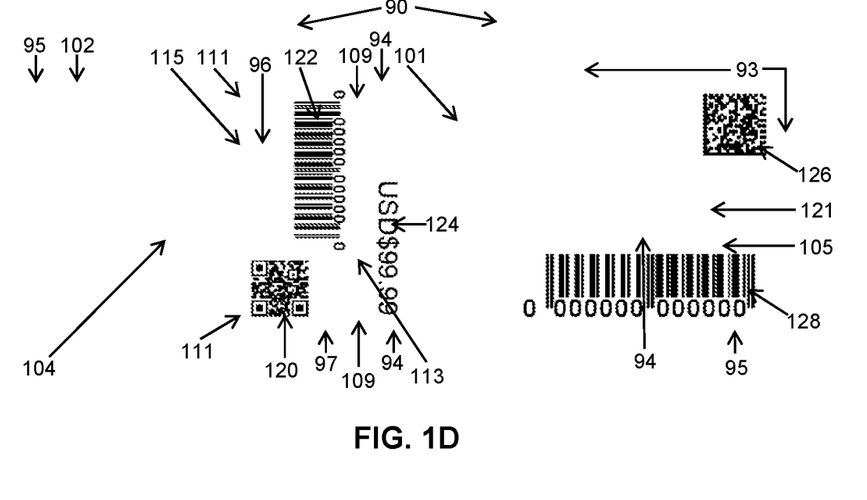
FIG. 1D shows a top view of an embodiment of a multi-purpose RFID label as shown in FIG. 1B or 1C, including printing of optical information on certain segments of the RFID label.
Figure 1E:
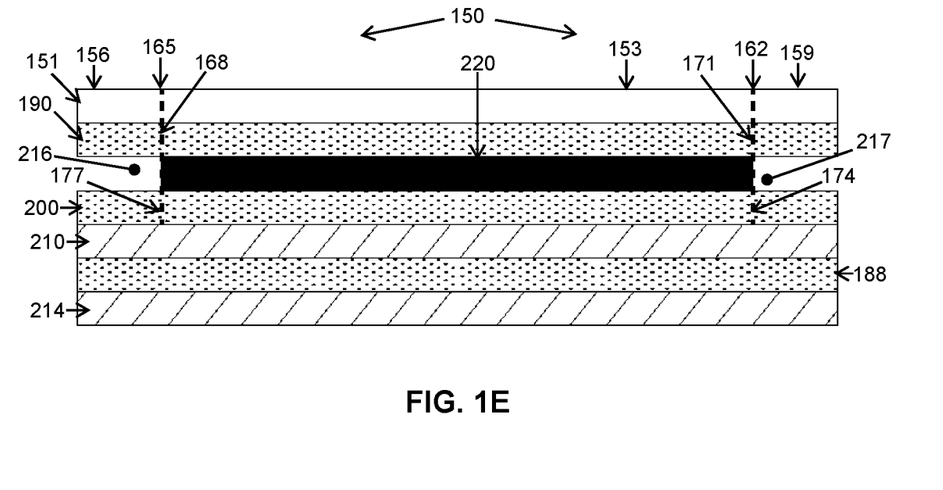
FIG. 1E shows a cross-sectional view of an example multi-purpose RFID label in accordance with various embodiments.
Figure 1F:
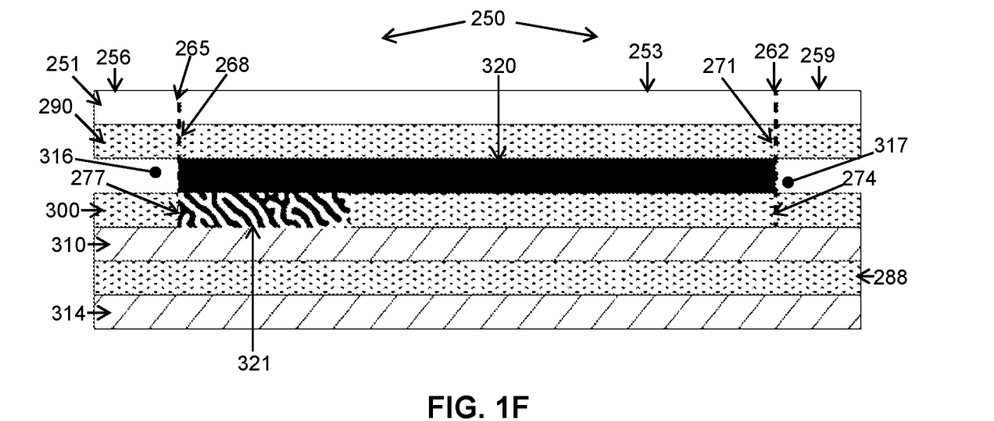
FIG. 1F shows a cross-sectional view of an example multi-purpose RFID label in accordance with various embodiments.
Figure 1G:
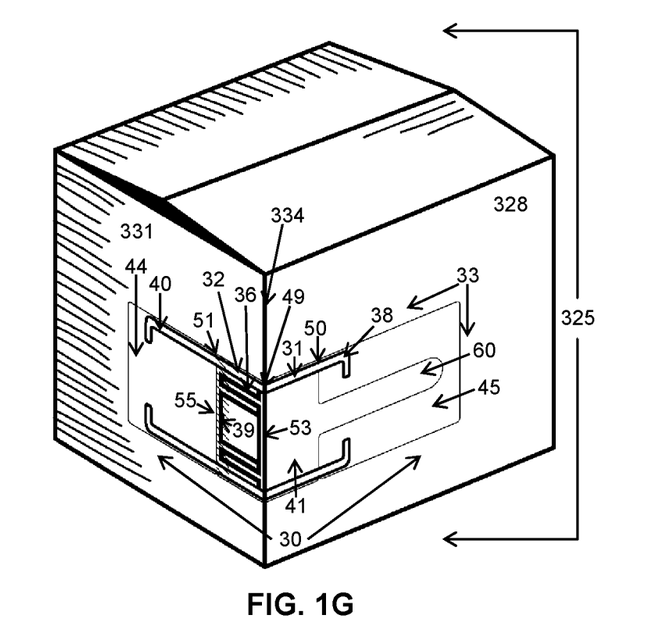
FIG. 1G shows a perspective view of an example of a multi-purpose RFID label in accordance with various embodiments applied to a shipping container.
Figure 1H:
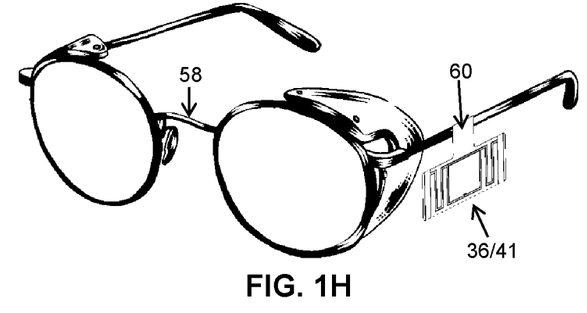
FIG. 1H shows a perspective view of an example configuration of an RFID label affixed to a product in accordance with various embodiments.

An example of this second configuration affixed to a product is depicted in FIG. 1H wherein a pair of sun glasses 58 is shown with the RFID label comprising first label section 36 and the foldable label section 41 folded upon each other and adhered together while being affixed to the sun glasses 58 by peel tab 60 which is folded over a portion of the sun glasses 58 and affixed to the reverse side of the RFID label.

In a third configuration, the first label section 36 alone can be removed from the composite label 33 and affixed to an object. The first antenna member 32 is disconnected from the second antenna member 31 and the fourth antenna member 38 at the foldable connection 49. The first antenna member 32 is also disconnected from the third antenna member 40 at a second releasable connection 51. The first label section 36 may affixed directly to an object/product using the adhesive layer on the bottom surface thereof. The first label section 36, has a third performance characteristic, different from the first or second performance characteristics. The performance characteristic may include a read range less than that of the read ranges of the first and second RFID label read ranges and would be suitable for use in a retail environment.

Another embodiment is depicted in FIG. 1C as a multi-purpose RFID label 60, which is similar to the multi-purpose RFID label 30 of FIG. 1B; however, in this embodiment, there is no antenna portion included on third label section 75. The multi-purpose RFID label 60 includes a composite RFID label 63 having an outer perimeter 65. The composite RFID label 63 may be affixed to a surface of a container holding an object, as is the case with composite RFID label 33, FIG. 1B. The multi-purpose RFID label 60 has a first label section 66 including an RFID transponder 69 interconnected to a first antenna member 62. The first label section 66 includes an outer perimeter 67 located within or coincident with the outer perimeter 65 and a first antenna member 62. The first label section 66 is removable from the composite label 63.

The first antenna member 62 of first label section 66 is interconnected to a second antenna member 61 which is disposed on foldable label section 71 by a foldable connection 79. The first antenna member 62 is also interconnected to a third antenna member 70 disposed on a second label section 74 by a second releasable connection 81.

Second label section 74 is defined by an area outside of a perimeter 67 of the first label section 66, outside of a perimeter 64 of a foldable label section 71, and within the outer perimeter 65. The second label section 74 has a perimeter 72 located within or coincident with the outer perimeter 65. A first seam 83 is disposed between the first label section 66 and the foldable label section 71. A second seam 85 is disposed between the first label section 66 and the second label section 74. The first seam 83 and the second seam 85 are independently foldable, releasable, or both. The foldable section 71 can include an optional peel tab 90 described below.

The composite RFID label 63 also includes a third label section 75 which is interconnected to foldable label section 71 by releasable connection 80. The peel tab 90 of foldable label section 71 extends into third label section 75.

Multi-purpose RFID label 60 may be used in several configurations. For example, in a first configuration, the composite RFID label 63 with the first label section 66 can be positioned in the composite label 63, with the first antenna member 62 interconnected to the second antenna member 61 and to third antenna member 70, forming an RFID label having a first performance characteristic, may be used. Like the multi-purpose RFID label 30 of FIG. 1B, the first configuration may be used for logistics and applied to a container such as a cardboard box containing an object such as a product. The first performance characteristic may include a particular "read" range, such as read range sufficient for logistics, which may be in the range of 5-6 meters, for example.

In a second configuration, the first label section 66 and the foldable label section 71, with the peel tab 90, can be removed from the composite label 63 and affixed to the object/product, which may be removed from the container/cardboard box on which the composite label 63 is affixed. The removed label sections may be affixed to the object/product for display at a retail location and they include the first antenna member 62 connected to the second antenna member 61. The first antenna member 62 has been disconnected from the third antenna member 70 at the releasable connection 81.

To apply this RFID label to the object/product, foldable label section 71 may be folded along seam 83 and affixed to bottom of first label section 66 and then the peel tab 90 may be folded over a portion of an object/product and secured to the object/product by affixing the bottom surface of peel tab 90, which includes an adhesive, to the bottom surface of foldable label section 71, which may also include an adhesive. The first label section 66 can form an RFID label with antenna sections 61 and 62 with a second performance characteristic different from the first performance characteristic. The second read range may be suitable for retail applications and may be in the range of up to 1-2 meters, for example. An example of the application to a product is depicted in FIG. 1H, which is described above with regard to FIG. 1B.

In a third configuration, the first label section 66 alone can be removed from the composite label 63 and affixed to an object. The first antenna member 62 is disconnected from the second antenna member 61 at the foldable connection 79. The first antenna member 62 is also disconnected from the third antenna member 70 at the releasable connection 81. The first label section 66 may be affixed directly to an object/product using the adhesive layer on the bottom surface thereof. The first label section 66, has a third performance characteristic, different from the first or second performance characteristics. The performance characteristic may include a read range less than that of the read ranges of the first and second RFID label read ranges and would be suitable for use in a retail environment.

According to some aspects of this disclosure, the multi-purpose RFID label 90, FIG. 1D, may include optically readable printing, such as a bar code and/or other written information, which may be used to identify the label and ultimately the object/product. For clarity, the RFID components are not depicted in this figure, but they could be configured as depicted in FIG. 1B or 1C above. The multi-purpose RFID label 90 includes a composite RFID label 93 having an outer perimeter 95. The composite label 93 can be affixed to a surface of a container holding an object. The multi-purpose RFID label 90 includes a first label section 96 that includes an RFID transponder, for example, as is depicted in other figures herein. The first label section 96 is removable from the composite label 93. The first label section can include, for example, printing such as a quick response (QR) code 120, a barcode 122, and/or a price 124. The first label section 96 includes an outer perimeter 97 located within or coincident with the outer perimeter 95. The first label section 96 is interconnected to foldable label section 101 with a foldable connection 109, and a first seam 113.

The first label section 96 is interconnected to a third label section 104 by a second foldable connection 111 and a second seam 115. The first seam 113 is disposed between the first label section 96 and the foldable label section 101. The second seam 115 is disposed between the first label section 96 and the third label section 104. The first seam 113 and the second seam 115 are independently foldable, releasable, or both. The multi-purpose RFID label includes a second label section 105 defined by an area outside of a perimeter 97 of the first label section 96, outside of a perimeter 94 of a foldable label section 101, and within the outer perimeter 95. The foldable label section 101 can include an optional peel tab 121. The third label section 104 has a perimeter 102 located within or coincident with the outer perimeter 95.

Any of the second label section 105, the foldable label section 101, and the third label section 104 can include, for example, printing such as QR codes 120/126, barcodes 122/128, descriptions, and/or a price 124.

It will be apparent in view of this disclosure that, in accordance with various embodiments, the first label section 96, the foldable label section 101, the second label section 105, and the third label section 104 can, individually or as a whole, be similar to the configurations depicted in the other figures herein. Generally speaking, the first label section 96, the second label section 105, the foldable label section 101, and the third label section 104 can include, for example, printing such as a QR code 120, a barcode 122, and/or a price 124 on the configurations depicted in FIGS. 1B and in FIG. 1C. The examples of print such as the depicted in FIG. 1D can be a layer extending over the embodiments depicted herein.

According to one aspect of the present disclosure, a label can include an RFID tag portion and a printable portion for optically readable information. Both portions can be secured to one or more underlying adhesive layers, which may each be independently releasable.

Referring now to FIG. 1E, a cross-sectional side view of an embodiment of a multi-purpose RFID label 150 is depicted. The multi-purpose RFID label 150 has a top layer 151 on which readable information can be printed, for example, on printable face material portions 153, 156, and 159. The printable face material portion 153 is disposed between the perforation 162 and the perforation 165. The printable face material portion 156 is disposed on the left hand side of the perforation 165. A printable face material portion 159 is disposed on the right hand side of the perforation 162. Each of the perforations depicted in FIG. 1E can be cut, perforated and/or continuous for implementation of various configurations. A first adhesive layer 190 is disposed between the top layer 151 and an RFID inlay 220. Each of the printable face material portions are removable separately or together, depending on the desired configuration. The perforation 165 extends as perforation 168 through the first adhesive layer 190. The second perforation 162 extends as perforation 171 through the first adhesive layer 190. Adjacent to the left edge of RFID inlay 220 there is an open space 216. And, aligned with perforation 168, there is a perforation 177 that extends through second adhesive layer 200. Adjacent to the right edge of RFID inlay 220 there is an open space 217. And, aligned with perforation 171, there is a perforation 174 that extends through the second adhesive layer 200.

Continuing to refer to RFID label 150, there is a release liner layer 210 is disposed between the second adhesive layer 200 and a third adhesive layer 188. A release liner layer 214 is disposed under the third adhesive layer 188. By configuring each of the perforations and/or release liners, layers can be peeled off to expose the adhesive layers. For example, this form enables the RFID tag to be applied directly to an object by the adhesive, in a manner similar to the embodiments described herein.

It will be apparent based on this disclosure that the thicknesses of the layers can be optimized for various configurations. During the manufacturing process, the multi-purpose RFID label may be perforated and/or die-cut at various locations in order to facilitate multi-purpose functions. After attachment onto a container, a portion of the label may then be removed from the container and adhesive can be utilized for application to subsequent containers, folding, or objects optionally in alternative configurations for other functions and purposes. The thickness of an adhesive layer depicted herein can be varied throughout the layer, for example, less adhesive may be utilized at an area near an edge to facilitate peeling a layer.

According to another aspect of this disclosure, referring now to FIG. 1F, a cross-sectional side view of an embodiment of a multi-purpose RFID label 250 is depicted. The multi-purpose RFID label 250 has a top layer 251 on which readable information can be printed on printable face material portions 253, 256, and 259. The printable face material portion 253 is disposed between the perforation 262 and the perforation 265. The printable face material portion 256 is disposed on the left hand side of the perforation 265. The printable face material portion 259 is disposed on the right hand side of the perforation 262. A first adhesive layer 290 is disposed between the top layer 251 and an RFID inlay 320. Each of the printable face material portions is removable individually or together. The perforation 265 extends as perforation 268 through the first adhesive layer 290. The second perforation 262 extends as perforation 271 through the first adhesive layer 290. Adjacent to the left edge of RFID inlay 320 is an open space 316. And, aligned with perforation 265, is perforation 277 which extends through a second adhesive layer 300. Adjacent to the right edge of RFID inlay 320 is an open space 317. And, aligned with perforation 262, is perforation 274 which extends through the second adhesive layer 300. Each of the perforations depicted in FIG. 1F can be cut, perforated and/or continuous for implementation of various configurations. For example, a portion of the multi-purpose RFID label 250 can be removed, exposing an adhesive layer, while retaining the remainder of the multi-purpose RFID label on a container.

Continuing to refer to RFID label 250, there is further included a release liner layer 310 which is disposed between the second adhesive 300 and a third adhesive layer 288. A release liner layer 314 is disposed under the third adhesive layer 288. An adhesive deadened area 321 is depicted under the RFID inlay 320. The adhesive deadened area can be utilized to enhance performance on a metallic surface, to form an RFID on metal tag. The RFID on metal tag can be a radio-frequency identification tag that performs a specific function when attached near or to metal objects. For example, the RFID on metal tag can overcome some of the problems traditional RFID tags suffer when near metal, such as detuning and reflecting of the RFID signal, which can cause poor tag read range, phantom reads, or no read signal at all. The capability of the RFID on metal tag can allow tracking small metal objects.

The RFID chip layers, the RFID transponders, and the various label sections disclosed herein can include an RFID inlay. The RFID inlay can be positioned in the multi-purpose RFID label with the RFID chip configured facing up or down. In some aspects, the technology features an RFID label including an additional release liner or additional adhesive layers for affixing to objects or for folding after the RFID label is affixed to a container. According to some aspects, the adhesive layers can allow a multi-purpose RFID label to be applied to different products for multi-product use.

Applications of a Label

The multi-purpose RFID tags disclosed herein can be applied to a container as a single label which contains one or more antenna components and structures. In some embodiments, any multi-purpose RFID tag disclosed herein can be folded when applied to a container or when applied to an object. According to an aspect of this disclosure, a multi-purpose RFID tag can be configured applied to a container as depicted in FIG. 1G. Referring now to FIG. 1G, container 325 has a multi-purpose RFID label 30 of FIG. 1B applied to a first container surface 328 and a second container surface 331 over a corner 334 formed at an intersection of the first container surface 328 and the second container surface 331. By spanning the RFID label 30 across two surfaces of the container, the read range of the RFID label 30 can be extended in multiple directions and performance can be enhanced.

The multi-purpose RFID label 30 includes a composite RFID label 33 on a surface 328 of the container 325 holding an object. The multi-purpose RFID label 30 includes a first label section 36 including an RFID transponder 39 interconnected to a first antenna member 32. The first label section 36 is removable from the composite label 33. The first antenna member 32 is interconnected to a second antenna member 31 by a foldable connection 49 and to fourth antenna member 38 with a releasable connection 50. The first antenna member 32 is interconnected to a third antenna member 40 by a second releasable connection 51. The multi-purpose RFID label includes a foldable label section 41 and a third label section 45. The foldable label section 41 can include an optional peel tab 60. The third label section 45 includes the fourth antenna member 38. The third antenna member 40 is included with a second label section 44. A first seam 53 is disposed between the first label section 36 and the foldable label section 41. A second seam 55 is disposed between the first label section 36 and the second label section 44. The first seam 53 and the second seam 55 are independently foldable, releasable, or both. The multi-purpose RFID label may be used in several configurations, for example as is described above in reference to FIG. 1B and to FIG. 1H.

Embodiments of a Multi Purpose RFID Label

Figure 2A:
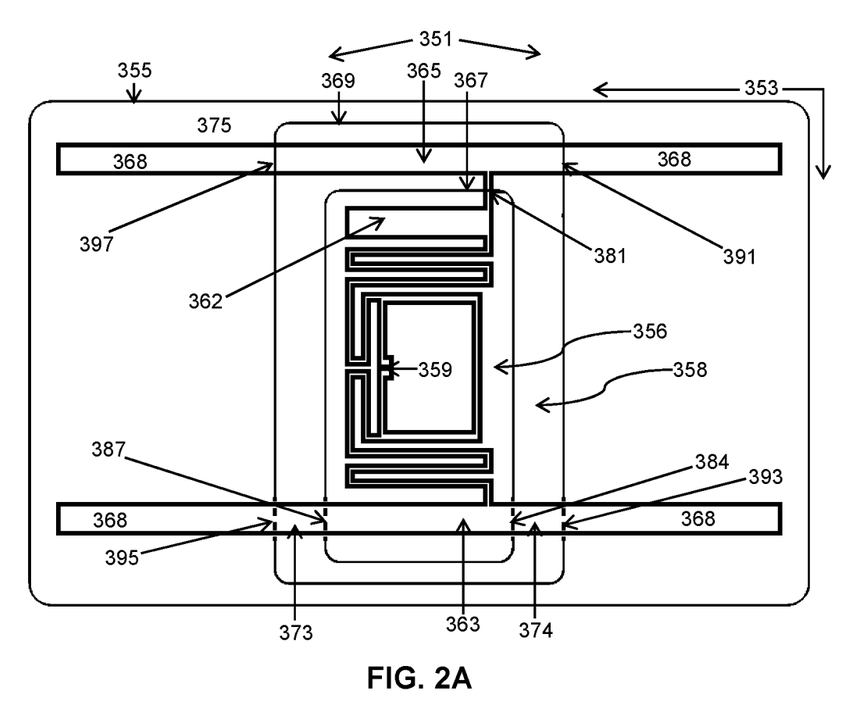
FIG. 2A shows a top view of another multi-purpose RFID label in accordance with various embodiments.

In another embodiment, referring now to FIG. 2A, a multi-purpose RFID label 351 is provided. The multi-purpose RFID label 351 includes a composite label 353 having an outer perimeter 355. The composite label can be affixed to a surface of a container holding an object. The multi-purpose RFID label 351 includes a first label section 356 located within the outer perimeter 355 of the composite label 353. The first label section 356 includes an RFID transponder 359 interconnected to a first antenna member 362 and to a second antenna member 363. The multi-purpose RFID label 351 includes a second label section 358 located within the outer perimeter 355 of the composite label 353 and outside of the outer perimeter 367 of the first label section 356. The second label section 358 includes a third antenna member 365 and extension antenna members 373 and 374. The first label section 356 is removable from the composite label 353. The first label section 356 is removable from the second label section 358. The first label section 356 and the second label section 358 can both be removed together from the composite label 353. The multi-purpose RFID label 351 includes a third label section 375 defined by an area outside of the perimeter 367 of the first label section 356, outside of the perimeter 369 of the second label section 358 and within the outer perimeter 355. The second label section 358 includes the third antenna member 365 interconnected to a fourth antenna member 368 by releasable connections 391 and 397.

In a first configuration, the first label section 356 and the second label section 358 may be positioned in the composite label 353, and the first antenna member 362 is interconnected to the third antenna member 365 and to fourth antenna member 368. The second antenna member 363 is interconnected to extension antenna members 373/374 and to fourth antenna member 368, forming an RFID label having a first performance characteristic. For example, in this configuration, the composite label 353 may be used in a logistics application and applied to a container.

In a second configuration, the first label section 356 can be removed from the composite label 353 and affixed to an object. In this configuration, the first antenna member 362 is disconnected from the third antenna member 365 at the releasable connection 381. The second antenna member 363 is disconnected from the extension antenna members 373 and 374 at the releasable connections 387 and 384. The first label section 356 can form an RFID label having a second performance characteristic different from the first performance characteristic.

Figure 2B:
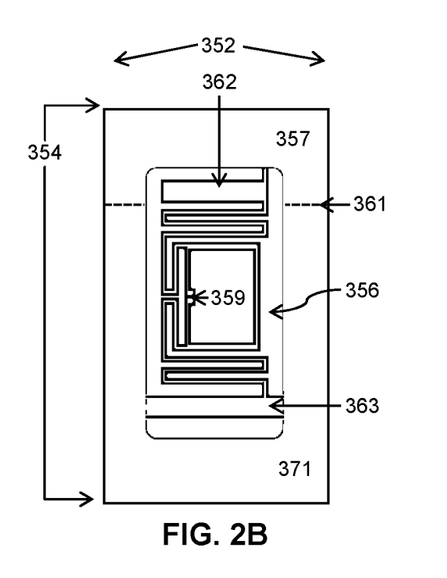
FIG. 2B shows a top view of an example configuration of an RFID label affixed to an object in accordance with various embodiments.
Figure 2C:
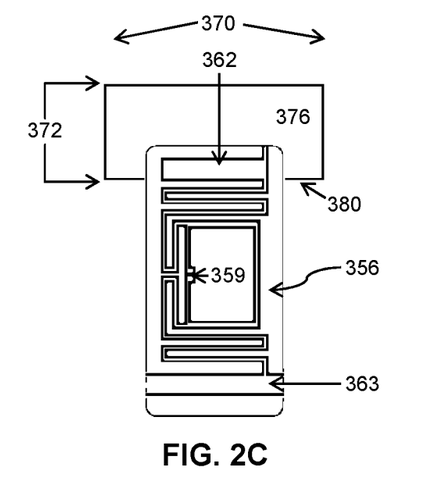
FIG. 2C shows a top view of another example configuration of an RFID label affixed to an object in accordance with various embodiments.

This first label section 356 can be designed specifically to be affixed to a metallic or semi-metallic object as is depicted in FIG. 2B. Referring now to FIG. 2B, an example configuration 352 of first label section 356 on a metallic surface 357 and a non-metallic surface 371 is shown. The surface of object 354 includes a metallic surface portion 357. A non-metallic surface portion 371 is separated from metallic surface portion 357 by the boundary illustrated by dashed line 361. For example, the majority of the first label section 356 can be affixed to the non-metallic surface portion 371; however, first antenna member 362 is affixed and can be directly electrically connected or capacitively coupled to the metallic surface portion 357. Thus, the metallic surface portion 357 becomes part of the antenna of the RFID Label and enhances the performance of the RFID label. Referring now to FIG. 2C, an example configuration 370 of first label section 356 extending from a metallic surface 376 is depicted. The surface of object 372 includes a metallic surface portion 376 and an edge 380. First antenna member 362 is affixed and electrically connected to the metallic surface portion 376. The majority of the first label section 356 is extending, for example, into the air or free-space into an area not part of the object 372.

Referring back to FIG. 2A, in a third configuration, the first label section 356 and the second label section 358 can be removed from the composite label 353 and together affixed to an object. The third antenna member 365 is released from the fourth antenna member 368 at the releasable connections 391 and 397. The second antenna member 363 (and the extension antenna members 373 and 374) are released from the fourth antenna member 368 at the releasable connections 393 and 395. The first label section 356 and the second label section 358 are both removed together from the composite label 353. The first label section 356 and the second label section 358 can form an RFID label having a third performance characteristic different from the first performance characteristic.

Figure 3:
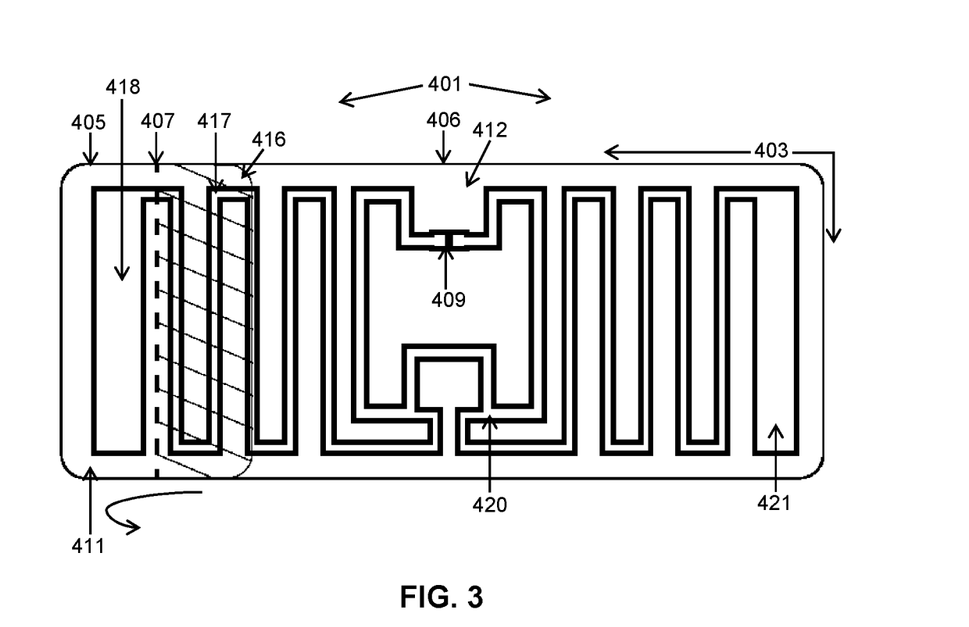
FIG. 3 shows a top view of a further multi-purpose RFID label in accordance with various embodiments.

In another embodiment, referring now to FIG. 3, a multi-purpose RFID label 401 is provided. The multi-purpose RFID label 401 includes a composite label 403 having an outer perimeter 405. The composite label can be affixed to a surface of a container holding an object. The multi-purpose RFID label 401 includes a first label section 412 located within the outer perimeter 405 of the composite label 403. The first label section 412 includes an RFID transponder 409 interconnected to a first antenna member 420 and to a second antenna member 418 and third antenna member 421. The multi-purpose RFID label 401 includes a second label section 411 located within the outer perimeter 405 of the composite label 403 and outside of the outer perimeter 406 of the first label section 412. The second label section 411 includes a foldable seam 407 and extension antenna member 417. The second label section 411 can be folded over label section 416. For example, the sections can be peeled off and applied to an object unfolded for use in an ETSI region or any of the sections can be peeled off and a portion of it is can be folded over onto itself, for example, and then applied to an object for use in an FCC region.

In a first configuration, the composite label 403 is in the unfolded position, the first antenna member 420 is interconnected to the second antenna member 418 and the third antenna member 421, having a first performance characteristic. The first performance characteristic may be a desired frequency range, such as a frequency range required by the ETSI. In a second configuration, second antenna member 418 is folded over the extension antenna member 417 at the seam 407 and the RFID label, providing the composite label 403 with a second performance characteristic different from the first performance characteristic. The second performance characteristic may be a different desired frequency range, such as a frequency range required by the U.S. FCC.

Figure 4:
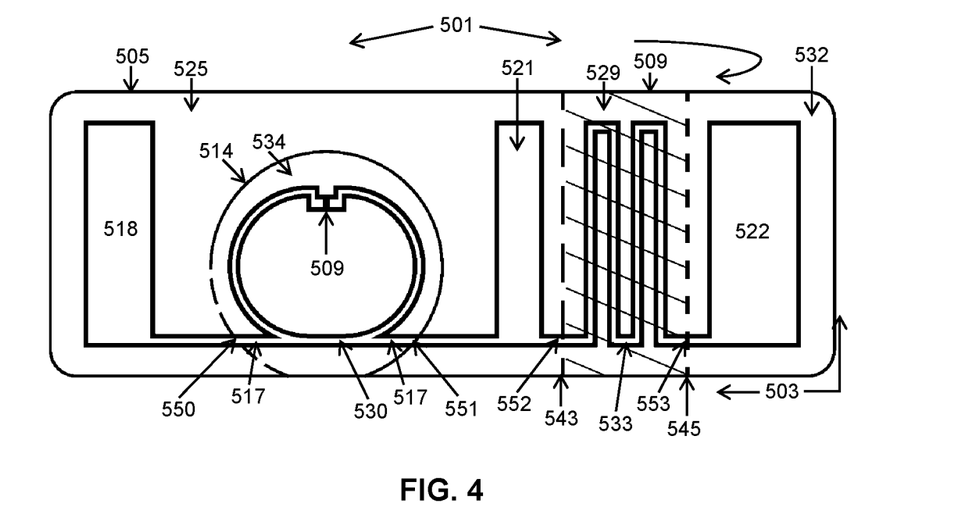
FIG. 4 shows a top view of yet another multi-purpose RFID label in accordance with various embodiments.

In yet another embodiment, referring now to FIG. 4, a multi-purpose RFID label 501 is provided. The multi-purpose RFID label 501 includes a composite label 503 having an outer perimeter 505. The composite label can be affixed to a surface of a container holding an object. The multi-purpose RFID label 501 includes a first label section 534 located within the outer perimeter 505 of the composite label 503. The first label section 534 includes an RFID transponder 509 interconnected to a loop antenna member 530 and a first antenna member 517. The first antenna member 517 is interconnected to a second antenna member 518, to a third antenna member 521, and to a fourth antenna member 522. The first label section 534 includes an outer perimeter 514 located within or consistent with outer perimeter 505. The multi-purpose RFID label 501 includes a second label section 525 located within the outer perimeter 505 of the composite label 503 and outside of the outer perimeter 514 of the first label section 534. The second label section 525 includes a second antenna member 518 and a third antenna member 521. The first antenna member 517 can be detached from the second antenna member 518 at detachable connection 550. The first antenna member 517 can be detached from the third antenna member 521 at releasable connection 551. The composite label 503 includes a detachable seam 543. The detachable seam 543 includes a detachable connection 552 positioned between the third antenna member 521 and a shaped extension antenna member 533. A second foldable seam 545 is disposed between the shaped extension antenna member 533 and the fourth antenna member 522. The second foldable seam 545 includes a second foldable connection 553 interconnecting the shaped extension antenna member 533 and the fourth antenna member 522. The composite label 503 includes a third label section 529 disposed between the second label section 525 and a fourth label section 532. The third label section 529 includes a shaped extension antenna 533. The fourth label section 532 includes the fourth antenna member 522.

In a first configuration, the first label section 534 can be positioned in the composite label 503, and the first antenna member 517 is interconnected to the second antenna member 518, a third antenna member 521, a shaped extension antenna member 533, and a fourth antenna member 522, forming an RFID label having a first performance characteristic. The first configuration can be used for logistics by applying the label to a shipping container. In another example, the first configuration can be used by peeling off the composite label 503 and applying the composite label to products, for example, apparel products or cardboard boxes. The first label section 534, the second label section 525, the third label section 529, and the fourth label section 532 can be applied for multi-product uses consistent with the first configuration.

In a second configuration, the first label section 534 can be removed from the composite label 503 and affixed to an object. The first antenna member 517 is disconnected from the second antenna member 518 by the detachable connection 550 and from the third antenna member 521 by the releasable connection 551. The first label section 534 can form an RFID label having a second performance characteristic different from the first performance characteristic. For example, the first label section 534 can be affixed to smaller object and have a very limited read range such as less than 1 m.

In a third configuration, the composite label 503 can be folded along seam 545 and fourth label section 532 can be folded onto the third label section 529. For example, the folding over can be utilized to apply the composite label to various types of products, for example, ceramics and glassware items. The third configuration can form an RFID label having a third performance characteristic different from the first and second performance characteristics.

In a fourth configuration, the first label section 534 and the second label section 525 can be removed from the composite label 503 by cutting at detachable seam 543. The third antenna member 521 is detached from the shaped antenna member 533 at detachable connection 552. The first label section 534 and the second label section 525 can form an RFID label having a fourth performance characteristic different from the first to third performance characteristics.

The unfolded and/or folded configurations described above can, referring to FIG. 4, be either ETSI or FCC tuned. The unfolded and folded states can be be designed to select the type of product the RFID label is applied to. For example, the unfolded state can be utilized for apparel or cardboard boxes. The folded state along seam 545, for example, can be utilized on ceramics and glassware items. After cutting along seam 543, for example, the fourth configuration can be utilized for attachment to various products, for example, glassware and ceramics.

The above embodiments describe the use of an antenna. The antenna can be a conductor or an electrical element. Any electrically conductive material can be used to make an antenna or an antenna structure. For example, while antennas can be made of metal, for example, aluminum, copper, and silver, any other conductive material, (e.g., printed conductive inks, or conductive graphene) can be used for the antenna material. Any suitable electrical element that can change a performance characteristic of the RFID portion in a desirable way may also be used in the present technology. Capacitive coupling can be utilized. This includes dielectric or magnetic materials. Materials, such as a copper conductor or an aluminum conductor, may be selected to inhibit energy of an RFID signal radiated from the antenna during interrogation when a material is attached or in close proximity to an RFID tag. In other examples, the material can be a dielectric that insulates an RFID tag from excitation energy or prevents an RFID antenna from exposure to radiating energy. Alternatively, materials having a high magnetic permeability, such as ferrites and certain metals, may be used to enable an interrogator to control the amount of RFID power coupled into an RFID antenna. This can be facilitated by changing the permeability of the material in the presence of a magnetic field produced by an RFID circuit.

Performance characteristics that can be changed herein include the operating frequency and interrogation range of the label. For example, the operating frequency of an RFID inlay. In the technology, the RFID tag can be programmed and used in regions with different operating frequencies. Currently, the United States and Europe have different operating frequencies of RFID tags. In some RFID printer systems, RFID labels are encoded with a certain operating frequency and the resulting tag is only usable in countries using that operating frequency. However, with the present technology, an RFID tag or label can be made to operate at any distinct frequencies. For example, one frequency in an unseparated state and another in a separated or detached state. For example, a first state can be at an operating frequency for a country of manufacture, and a second state can be at an operating frequency for a country of label use. In another example, the different performance characteristics can affect the sensitivity of the RFID inlay.

Although the technology describes use of RFID, antennas, and conductors, it should be understood that any suitable electrical element that can change a performance characteristic of an RFID portion in a desirable way may also be used in the present technology. This includes dielectric or magnetic materials. Materials, such as a copper conductor, may be selected to inhibit energy of the RF signal radiated from the antenna during interrogation when the material is attached or in close proximity to the RFID tag. In other applications, a material can be a dielectric that insulates the RFID tag from excitation energy or prevents the RFID antenna from radiating energy. Alternatively, materials having a high magnetic permeability, such as ferrites and certain metals, may be used. This can be facilitated by changing a permeability of the material in the presence of the magnetic field produced by the RFID circuit.

While the foregoing description enables one of ordinary skill to make and use what is considered presently to be the best mode, those of ordinary skill will understand and appreciate the existence of variations, combinations, and equivalents of the specific embodiments and examples herein. The above-described embodiments of the present technology are intended to be examples only. Alterations, modifications and variations may be effected to the particular embodiments by those of skill in the art without departing from the scope of the technology, which is defined solely by the claims appended hereto.

The technology is therefore not limited by the above described embodiments and examples, embodiments, and applications within the scope and spirit of the technology claimed as follows.

The invention claimed is:

1. A multi-purpose RFID label, comprising:
   a composite label affixed to a surface of a container holding an object and having an outer perimeter;
   a first label section located within the outer perimeter of the composite label; the first label section including an RFID transponder interconnected to a first antenna member, the first label section being removable from the composite label;
   a second label section defined by an area outside of the first label section and within the outer perimeter; the second label section including a second antenna member interconnected to the first antenna member;
   wherein, in a first configuration, the first label section is positioned within the composite label and the first antenna member is interconnected to the second antenna member thereby forming an RFID label having a first performance characteristic; and
   wherein, in a second configuration, the first label section is removed from the composite label and is configured to be affixed to the object which has been removed from the container; and wherein the first antenna member is disconnected from the second antenna member and the first label section forms an RFID label having a second performance characteristic different from the first performance characteristic.

2. The multi-purpose RFID label of claim 1, wherein the first and second performance characteristics include one or both of read range and frequency range, wherein the read range of the RFID label in the first configuration is greater than the read range of the RFID label in the second configuration, and wherein the frequency range is tuned for ETSI or FCC.

3. The multi-purpose RFID label of claim 2, wherein the read range of the RFID label in the second configuration less than the read range of the RFID label in the first configuration.

4. The multi-purpose RFID label of claim 2, wherein the second label section includes two label sub-sections each comprising a portion of the second antenna member, a bottom surface with an adhesive, and a top surface; the two label-sub-sections being be adjacent to each other in a first configuration thereby forming an RFID label having a first performance characteristic tuned for ETSI operation and being operative in a second configuration to be folded upon each other such that the bottom surfaces of the label sub-sections are adhered to each other in a face to face arrangement, thereby forming an RFID label having a first performance characteristic tuned for FCC operation.

5. The multi-purpose RFID label of claim 1, wherein the first label section includes an adhesive layer disposed along a bottom surface thereof.

6. The multi-purpose RFID label of claim 5, wherein the second label section comprises a release layer disposed beneath the adhesive layer of the first label section to allow the first label section to be removed from the composite label.

7. The multi-purpose RFID label of claim 1, wherein the first label section includes two label sub-sections each having a bottom surface with an adhesive and a top surface, the two label-sub-sections being operative to be folded upon each other such that the bottom surfaces of the label sub-sections are adhered to each other in a face to face arrangement, and wherein one of the two label subsections includes a tab extending out therefrom and having a top surface and a bottom surface including an adhesive, the tab operative to be folded over a portion of the object and then the bottom surface of the tab adhered to the top surface of the other of the two label subsections to affix the first label subsection to the object.

8. The multi-purpose RFID label of claim 1, wherein the first label section comprises:
a first label subsection and a second label subsection; the first label subsection including the RFID transponder interconnected to a first portion of the first antenna member, the first label subsection being removable from the first label section;
a second label subsection defined by an area outside of the first label subsection section and within an outer perimeter of the first label section; the second label subsection including a second portion of the first antenna member which is interconnected to the first portion of the first antenna member;
wherein, in a first configuration, the first label subsection is positioned within the first label section and the first portion and second portion of the first antenna member are interconnected thereby forming an RFID label having the second performance characteristic; and
wherein the first label section is configured to be affixed to the object which has been removed from the container; and
wherein, in a second configuration, the first label subsection is removed from the first label section and is configured to be affixed to the object which has been removed from the container; and wherein the first portion of the first antenna member is disconnected from the second portion of the first antenna member and the first label subsection forms an RFID label having a third performance characteristic different from the first and second performance characteristics.

9. The multi-purpose RFID label of claim 8, wherein the second performance characteristic is tuned for the object to be formed of a non-metallic material and the third performance characteristic is tuned for the object to be formed of a metallic material.

10. A method for using a multi-purpose RFID label, comprising:
applying a composite label affixed to a surface of a container holding an object and having an outer perimeter, the composite label having a first performance characteristic and including;
a first label section located within the outer perimeter of the composite label; the first label section including an RFID transponder interconnected to a first antenna member, the first label section being removable from the composite label;
a second label section defined by an area outside of the first label section and within the outer perimeter; the second label section including a second antenna member interconnected to the first antenna member;
removing the object from the container;
removing the first label section from the composite RFID label; and
applying the first label section to the object, the first label section forming an RFID label having a second performance characteristic different from the first performance characteristic.

11. The method of claim 10, wherein the first and second performance characteristics include one or both of read range and frequency range, wherein the read range of the composite RFID label is greater than the read range of the first label section, and wherein the frequency range is tuned for ETSI or FCC.

12. The method of claim 11, wherein the read range of the first label section is less than the read range of the composite RFID label.

13. The method of claim 11, wherein the second label section includes two label sub-sections each comprising a portion of the second antenna member, a bottom surface with an adhesive, and a top surface; positioning the two label-sub-sections adjacent to each other in a first configuration thereby forming an RFID label having a first performance characteristic tuned for ETSI operation and folding the two label-sub-sections upon each other such that the bottom surfaces of the two label sub-sections are adhered to each other in a face to face arrangement, thereby forming an RFID label having a first performance characteristic tuned for FCC operation.

14. The method of claim 10, wherein the first label section includes an adhesive layer disposed along a bottom surface thereof.

15. The method of claim 14, wherein the second label section comprises a release layer disposed beneath the adhesive layer of first label section and the method includes removing the first label section from the release layer.

16. The multi-purpose RFID label of claim 10, wherein the first label section includes two label sub-sections each having a bottom surface with an adhesive and a top surface, wherein the two label-sub-sections are folded upon each other such that the bottom surfaces of the label sub-sections are adhered to each other in a face to face arrangement, wherein one of the two label subsections includes a tab extending out therefrom and having a top surface and a bottom surface including an adhesive, and wherein the tab is folded over a portion of the object and then the bottom surface of the tab is adhered to the top surface of the other of the two label subsections to affix the first label subsection to the object.

17. The method of claim 10, wherein the first label section comprises:
 a first label subsection and a second label subsection; the first label subsection including the RFID transponder interconnected to a first portion of the first antenna member, the first label subsection being removable from the first label section;
 a second label subsection defined by an area outside of the first label subsection section and within an outer perimeter of the first label section; the second label subsection including a second portion of the first antenna member which is interconnected to the first portion of the first antenna member;
 wherein, in a first configuration, the first label subsection is positioned within the first label section and the first portion and second portion of the first antenna member are interconnected thereby forming an RFID label having the second performance characteristic; and wherein the first label section is affixed to the object which has been removed from the container; and
 wherein, in a second configuration, the first label subsection is removed from the first label section and is affixed to the object which has been removed from the container; and wherein the first portion of the first antenna member is disconnected from the second portion of the first antenna member and the first label subsection forms an RFID label having a third performance characteristic different from the first and second performance characteristics.

18. The method of claim 17, wherein the second performance characteristic is tuned for the object to be formed of a non-metallic material and the third performance characteristic is tuned for the object to be formed of a metallic material.

19. A RFID label disposed on a container, the RFID label comprising:
 a first label section including an RFID transponder interconnected to a first antenna member; the first label section being affixed to a first surface of the container;
 a second label section including a second antenna member interconnected to the first antenna member; the second label section being affixed to a second surface of the container;
 wherein the first label section and the second label section together define a composite RFID label having a first performance characteristic;
 wherein the first label section is removable from the composite RFID label and wherein when the first label section is removed from the composite RFID label the first antenna member is disconnected from the second antenna member and the first label section has a second performance characteristic different from the first performance characteristic; and
 wherein the composite RFID label having the first performance characteristic is configured for logistics to track the container and wherein the first label section is configured to be applied to an object removed from the container to identify the object in a retail environment.

20. A method for disposing a RFID label on a container, the method comprising:
 applying a first label section including an RFID transponder interconnected to a first antenna member to a first surface of the container;
 applying a second label section including a second antenna member interconnected to the first antenna member to a second surface of the container; wherein the first label section and the second label section together define a composite RFID label having a first performance characteristic;
 using the composite RFID label having the first performance characteristic for logistics to track the container;
 removing the first label section from the composite RFID label and wherein when the first label section is removed from the composite RFID label the first antenna member is disconnected from the second antenna member and the first label section has a second performance characteristic different from the first performance characteristic;
 removing an object from the container; and
 applying the first label section to the object to identify the object in a retail environment.

21. A multi-purpose RFID label configured to be applied to a surface of a container, comprising:
 a first label section including an RFID transponder interconnected to a first antenna member; the first label section having a top surface and a bottom surface;
 a second label section interconnected to the first label section by a foldable seam; the second label section including a second antenna member interconnected to the first antenna member; the second label section having a top surface and a bottom surface;
 wherein, in a first configuration, the top and bottom surfaces of the second label section are positioned adjacent to the respective top and bottom surfaces of the first label section and the multi-purpose RFID has a first performance characteristic; and
 wherein, in a second configuration, the second label section is folded at the seam and the bottom surface of the second label section is affixed to the bottom surface of the first label section in a face to face arrangement and the multi-purpose RFID label has a second performance characteristic different from the first performance characteristic.

22. The multi-purpose RFID label of claim 21 wherein the first performance characteristic includes a first operational frequency range and the second performance characteristic includes a second operational frequency range.

23. The multi-purpose RFID label of claim 22 wherein the first operational frequency range is ETSI compliant and the second operational frequency range is FCC compliant.

24. A method for applying a multi-purpose RFID label configured to a surface of a container, comprising:
 providing a first label section including an RFID transponder interconnected to a first antenna member; the first label section having a top surface and a bottom surface;
 providing a second label section interconnected to the first label section by a foldable seam; the second label section including a second antenna member interconnected to the first antenna member; the second label section having a top surface and a bottom surface;

positioning, in a first configuration, the top and bottom surfaces of the second label section adjacent to the respective top and bottom surfaces of the first label section and applying the multi-purpose RFID to the surface of the container to provide has a first performance characteristic; and folding, in a second configuration, the second label section at the seam and affixing the bottom surface of the second label section to the bottom surface of the first label section in a face to face arrangement, applying the multi-purpose RFID label to the surface to provide a second performance characteristic different from the first performance characteristic.

25. The method of claim 24 wherein the first performance characteristic includes a first operational frequency range and the second performance characteristic includes a second operational frequency range.

26. The method of claim 25 wherein the first operational frequency range is ETSI compliant and the second operational frequency range is FCC compliant.

* * * * *